April 7, 1964 B. D. LOUGHLIN 3,128,333

ELECTRONIC PREVIEWER FOR COLOR PRINTING PROCESSES

Filed Jan. 12, 1960 5 Sheets-Sheet 1

April 7, 1964 B. D. LOUGHLIN 3,128,333

ELECTRONIC PREVIEWER FOR COLOR PRINTING PROCESSES

Filed Jan. 12, 1960 5 Sheets-Sheet 5

United States Patent Office
3,128,333
Patented Apr. 7, 1964

3,128,333
ELECTRONIC PREVIEWER FOR COLOR PRINTING PROCESSES

Bernard D. Loughlin, Huntington, N.Y., assignor to Hazeltine Research, Inc., a corporation of Illinois
Filed Jan. 12, 1960, Ser. No. 1,898
12 Claims. (Cl. 178—5.2)

Figure 1A:
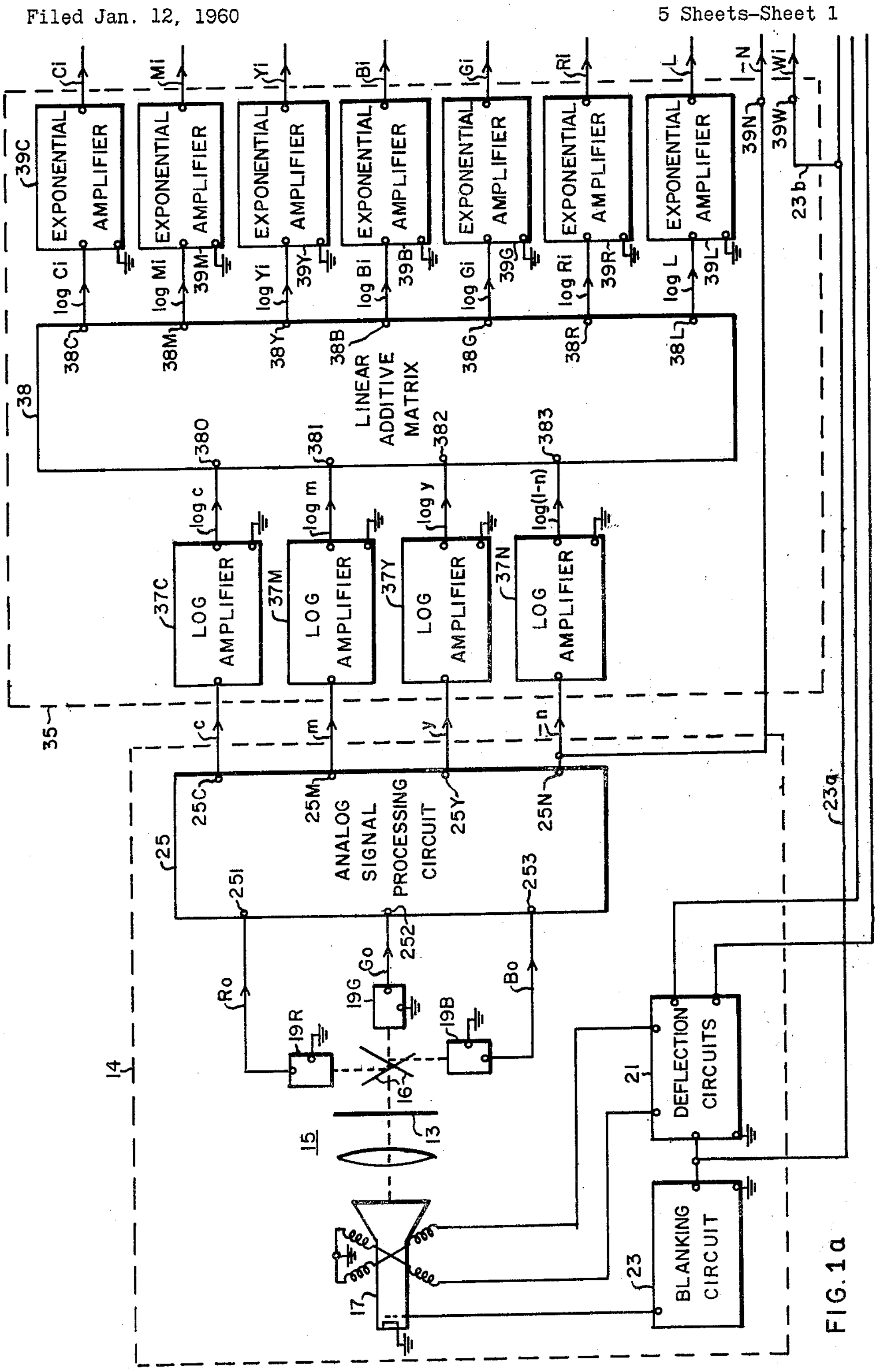

This invention pertains to electronic simulation of color printing processes, and particularly to means by which electrical signals representing the different half-tone color-separation images which will be printed to form a color reproduction of an original color picture may be utilized to control electronic color-image-reproducing means to display an electronic color image closely simulating the appearance of the printed color reproduction which will be obtained.

Color printing processes for large volume reproduction of an original color picture such as a painting or photograph are generally of the type wherein a set of photo-engraved printing plates are prepared carrying relief half-tone images of respective primary color components of the original picture. These color components are usually cyan, magenta and yellow, since printing inks of these colors are readily available. For high quality reproduction, a fourth printing plate is also prepared which carries a relief half-tone image of the relative amount of black in different incremental regions of the picture. The plates are then respectively coated with inks of the corresponding colors, namely, cyan, magenta, yellow and black, and are successively impressed in register on a sheet of white paper. The half-tone colored dots of the different printed images in corresponding incremental regions thereof result in formation of a composite color reproduction of the original color picture, the dots being beyond the resolution of the human eye when the reproduction is seen from normal viewing distances.

The resultant color in any incremental region of the printed reproduction will be governed by the relative areas of the various colored dots printed therein. For example, in a region where the original picture is strongly red, the half-tone dots in the printed cyan image will be small and those in the printed magenta and yellow images will be large. Since these colors are the complements of red, green and blue, respectively, the resultant color of the region in question in the reproduction will appear as a strong red similar to that of the same region of the original picture.

A serious problem in such printing processes is that, because the ink colors do not precisely match the primary colors required to reproduce the original picture and also because of colorimetric errors which arise in the various operations involved, the printing plates which are obtained must be subjected to extensive correction in order to obtain good color reproduction. This is true despite the fact that many corrective measures are taken in the preceding printing operations in an attempt to precompensate for these errors. Correction of the printing plates involves a lengthy series of cumulative cut-and-try modifications known as "proofing," whereby a skilled artisan uses acid etching or equivalent techniques to increasingly alter the relative areas of the dots in different regions of each plate until inked impressions or "proofs" obtained therefrom conform with his judgment of when the corresponding corrected plates together will yield a printed reproduction of satisfactory quality. Not only is this time-consuming and expensive, but the results are highly variable depending on the skill of the individual artisan.

The proofing operation may be greatly shortened or entirely eliminated, and the various color printing operations adjusted to produce a predicted effect, by the use of the electronic previewer disclosed in the copending application of W. F. Bailey, filed November 23, 1959 Serial No. 854,742, and assigned to applicant's assignee, which matured into Patent No. 3,123,666, March 3, 1964. As described in more detail therein, such a previewer includes electro-optical means by which electrical signals are derived from the original picture respectively representing the reflection densities of the individual inked or otherwise pigmented impressions which will be laid down in the color reproduction in correspondence with respective color-separation images of the original picture. The previewer also includes matrixing circuit means for translating the reflection density signals to electronic image-reproducing means and modifying them in accordance with the relative spectral absorptions of the pigments employed as well as the relative spectral taking responses of the image-reproducing means in each of a plurality of spectral regions. The image-reproducing means is thus caused to display an electronic preview image of the resultant color reproduction which will actually be obtained. In contrast to that approach, the present invention utilizes signals corresponding to the areas of the different colored half-tone dots which will be printed in each incremental region of the reproduction. These signals are then processed in accordance with the relationship between the various dot areas and the respective color components resulting therefrom in each such region and further in accordance with the relationship between the printed color components and the different set of controlled primary colors which are produced by the electronic image-reproducing means. These operations may be coordinated so as to achieve maximum simplicity and economy of the equipment required.

An object of the invention is to provide an electronic previewer including means for simulating the relationship between the respective colored half-tone dots which will be printed in incremental regions of a printed color reproduction of an original color picture and the resultant color components in each such region of the reproduction.

A further object is to provide an electronic previewer including means for simulating the color matching relationships between the color components which will be produced in incremental regions of a printed color reproduction by colored half-tone dots printed therein and the set of controlled primary color components of light produced by electronic color-image-reproducing means for displaying an electronic color image previewing the printed color reproduction which will be so obtained.

A further object is to provide such an electronic previewer wherein the relationship between the areas of the different colored half-tone dots which will be printed in the color reproduction and the color matching relationships between the printed color components produced thereby in each incremental region and the controlled primary color components of light produced by the electronic color-image-reproducing means are all simulated in an integrated manner so as to achieve maximum economy and simplicity of construction and operation of the previewer.

An electronic previewer in accordance with the invention is adapted to display an electronic preview color image of the printed color reproduction which will be obtained from an original color picture by printing photo-engraved half-tone color-separation images thereof in pigments of the corresponding colors. The previewer comprises electronic color-image-reproducing means for producing respective primary color components of light which form the displayed image. It also comprises electro-optical input means for deriving from the original picture electrical signals representing the relative areas of the colored half-tone dots which will be printed in each incremental region of the color reproduction by respective ones of the color-separation images. It additionally comprises first signal processing means for combining the individual dot area-representative signals in accordance with the contributions of all dots to the individually evaluated proportions of the color components which will be printed thereby in each such region. Finally, the previewer comprises second signal processing means for combining the printed color component-representative signals to produce signals for respectively controlling the primary color components of light produced by the electronic image-reproducing means, such further signal combination being in accordance with the color matching relationships between the printed color components and the electrically displayed primary color components. The control signals thus cause the image-reproducing means to display the above-mentioned preview electronic color image.

Other and further objects and features of the invention will be set forth in the following specification and accompanying drawings, noting, however, that the actual scope of the invention is defined in the appended claims.

Figure 1B:
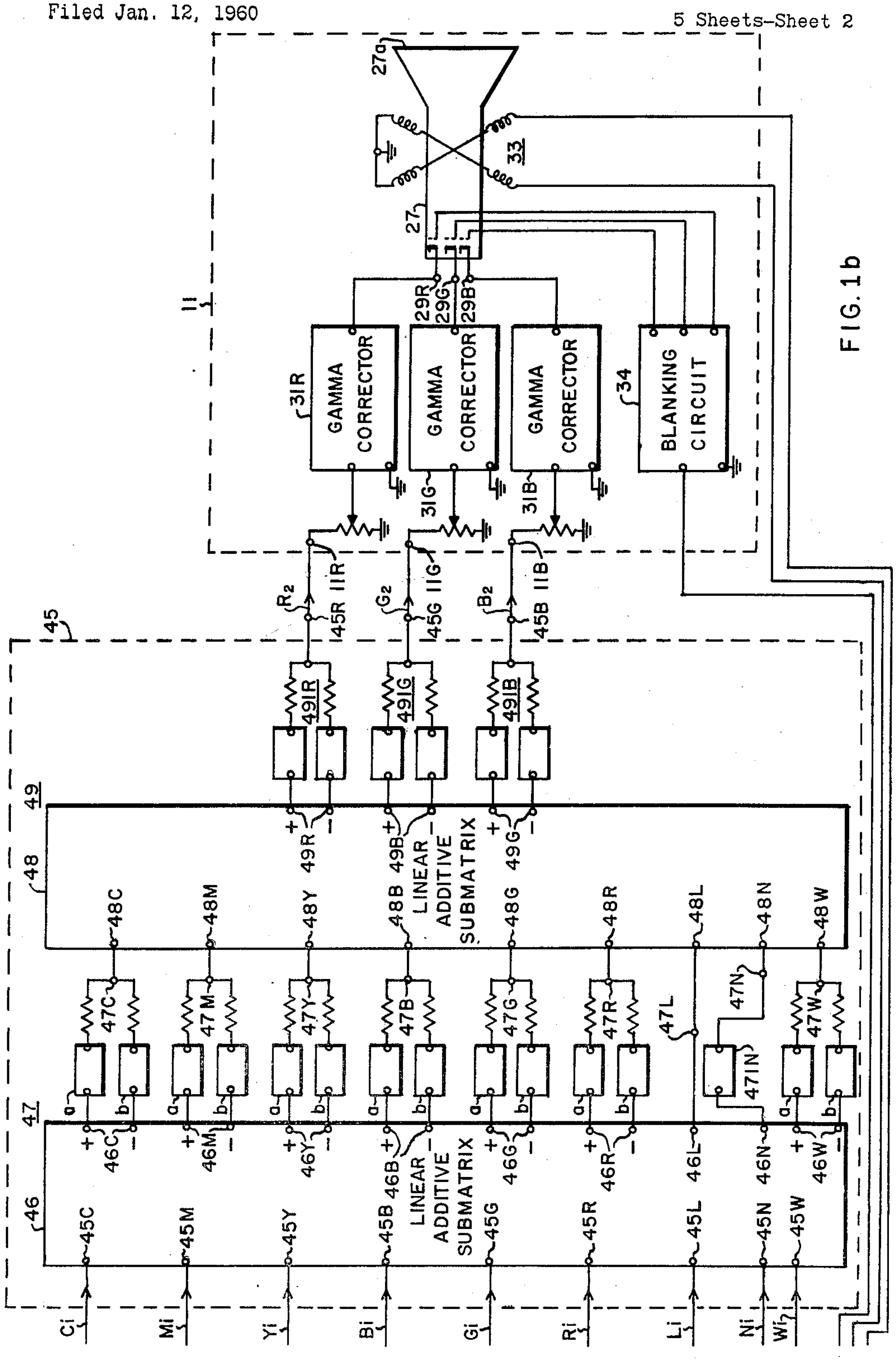
Figure 2:
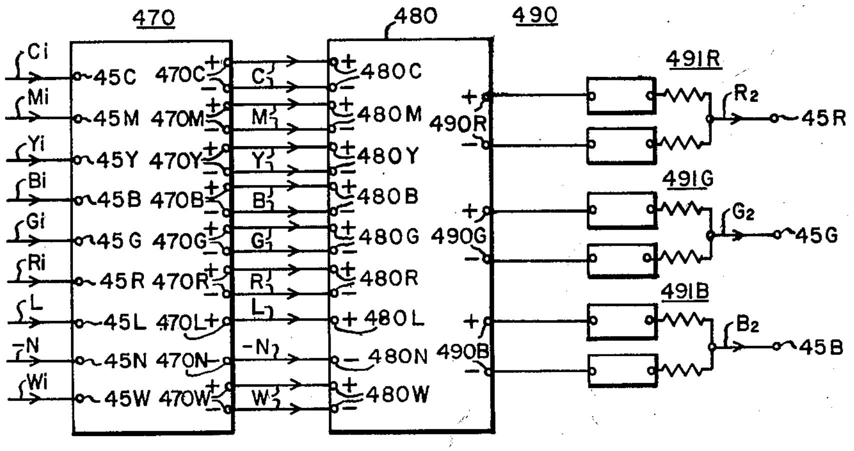
Figure 4A:
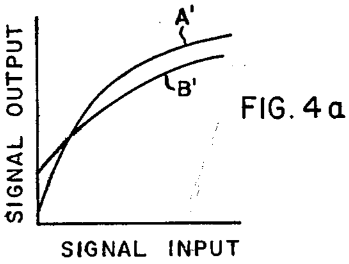
Figure 4:
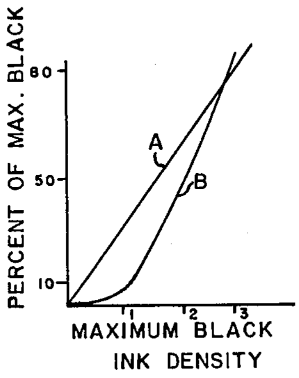
Figure 5:
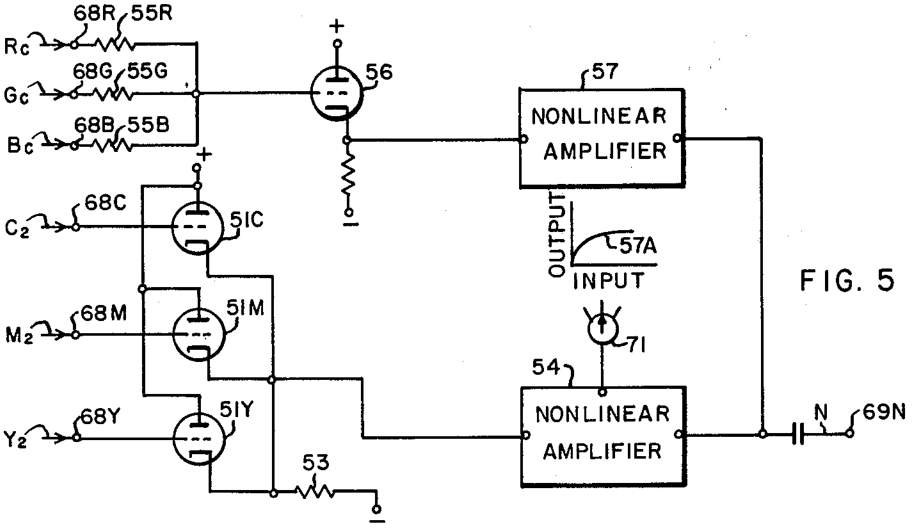
Figure 3A:
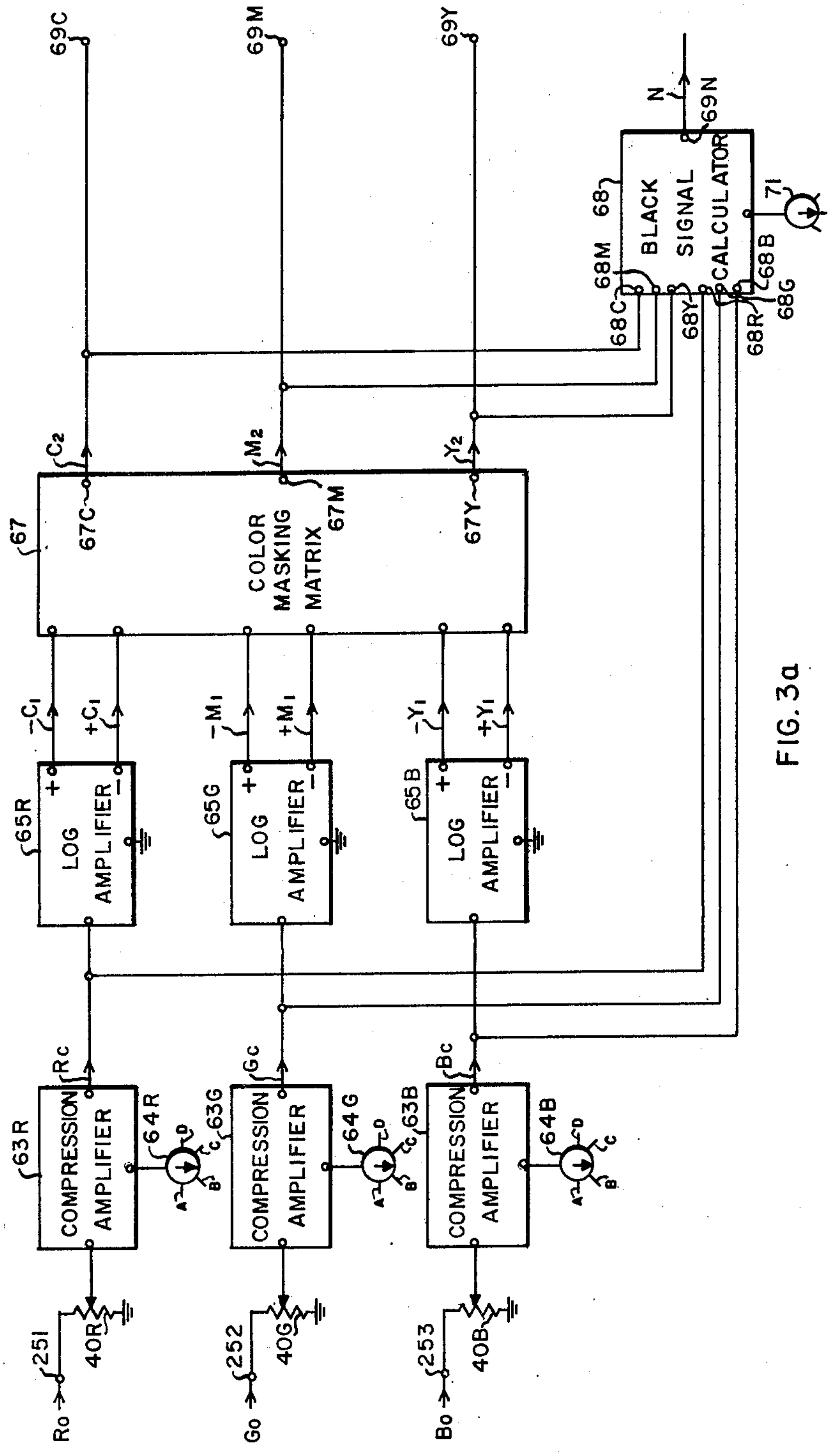
Figure 3B:
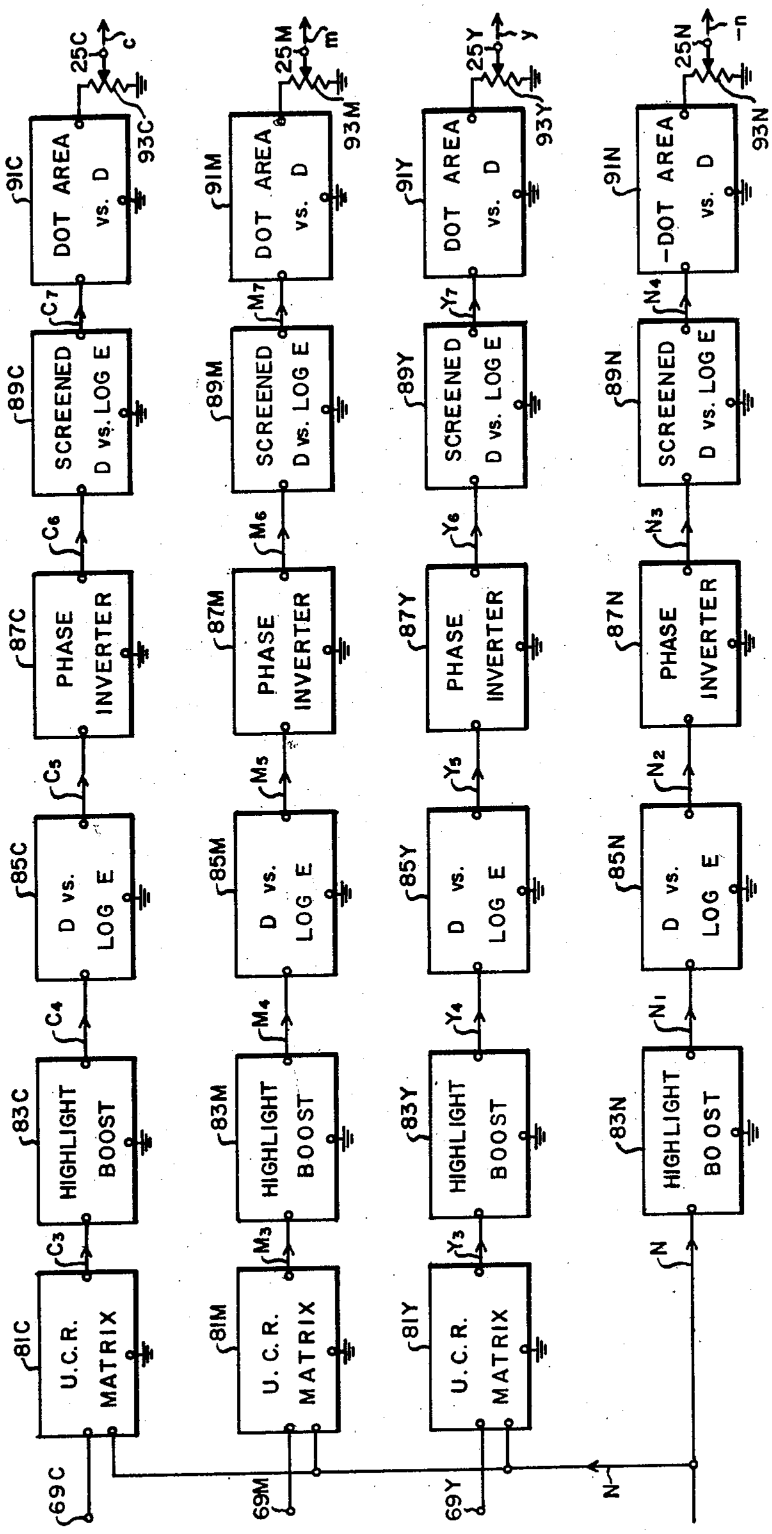

FIG. 1 comprises the two halves, 1*a* and 1*b*, which, when joined as indicated, form the complete circuit diagram of an electronic previewer in accordance with the invention;

FIG. 2 is a circuit diagram of an alternative form of signal cross-coupling means 45 in FIG. 1;

FIG. 3, comprising the two halves, 3*a* and 3*b*, is a block diagram of one type of analog signal processing circuit 25 in the previewer of FIG. 1;

FIGS. 4 and 4*a* are graphs of black printing characteristics of the type involved in the construction of the analog circuit of FIG. 3, and FIG. 5 is a circuit diagram of a particular type of black signal calculator circuit which may be employed in the analog circuit of FIG. 3.

THEORETICAL PRINCIPLES OF COLOR PRINTING

All of the colors in a printed color picture may be considered to be formed by the additive combination in each incremental region of appropriate proportions of a specific set of printed primary color components. These color components are formed by the half-tone colored dots which are laid down by the respective photo-engraved color-separation printing plate images, and the proportions thereof may be expressed in terms of the relative areas of the different color dots in each incremental region. The applicable relationships are given by a set of equations now generally referred to as the "Neugebauer equations," and are described in detail in the article, "Color Correction in Color Printing," by Hardy and Nurzburg at pages 300 to 307 of the April 1948 issue of the Journal of the Optical Society of America. In accordance with these teachings, the printed color components referred to will comprise the colors of the individual dots and the colors of all combinations thereof taken two at a time, three at a time, etc. Specifically, with regard to cyan, magenta, yellow and black dots, which are the subtractive primary colors most employed in color printing, nine printed color components will be produced thereby. Cyan, magenta and yellow will be present wherever portions of the dots of those colors are present and are not overlapped by any other dot. Portions of the cyan and magenta dots which overlap each other but which do not overlap the yellow dot will print as blue. Similarly, overlapping portions of the cyan and yellow dots alone will print green and overlapping portions of the magenta and yellow dots alone will print red. These six printed color components are further augmented by a dark grey or poor black, which will be denoted L wherever the cyan, magenta and yellow dots all overlap. The remaining two color components comprise the white of the printing paper itself wherever no portion of any dot is present, and black wherever any part of a black dot is present. The relative proportions of the color components in any incremental region will be governed by the relative areas of the various colored dots therein, and, in turn, will determine the resultant color of that region of the picture.

The Neugebauer equations place the foregoing principles on a quantitative basis by denoting the respective fractional areas of the cyan, magenta, yellow and black half-tone dots which are printed in any incremental region as $c$, $m$, $y$ and $n$. That is, if the cyan dot covers half of the total area of the region in question, the value of $c$ would be 0.5. Since the printing paper is itself white, the entire area is initially that color. However, since a fractional area "$n$" thereof will be rendered black by the black dot, only the fractional area $(1-n)$ is actually left available for all other colors. Accordingly, the individually evaluated proportions of the cyan, magenta and yellow printed color components will be $c(1-n)$, $m(1-n)$ and $y(1-n)$, respectively. Since blue is provided by overlapping of the cyan and magenta dots, the individually evaluated proportion of blue will be $cm(1-n)$. By the same reasoning, the individually evaluated proportion of green will be $cy(1-n)$ and of red will be $my(1-n)$. The grey color L printed by overlapping the $c$, $m$ and $y$ dots will be present in the proportion $cmy(1-n)$.

It should be clearly understood that except for grey and black, the above-stated individually evaluated proportions of the printed color components produced by the colored half-tone dots do not represent the resultant relative proportions thereof in incremental regions of the printed reproduction. That is, the quantity $c(1-n)$ represents the proportion of cyan evaluated on the basis that the only colored dot besides black present in any region is cyan. Similarly, the quantity $cm(1-n)$ represents the proportion of blue evaluated on the basis that the only colored dots which are present besides black are cyan and magenta.

Evaluation of the resultant proportions of the printed color components in any region depends on the relative contributions of each individual component to all color components, since the areas of color components produced by combinations of different dots will commensurately reduce the areas of the components which each dot alone would otherwise produce. Thus, suppose that the black dots are printed first and are followed by the cyan dots. An area $c(1-n)$ will then be cyan and an area $(1-c)(1-n)$ will remain white. If the magenta dots are then printed, an area $m(1-c)(1-n)$ which had been white will become magenta and an area $mc(1-n)$ which had been cyan will become blue. The remaining cyan area will then be $c(1-n)-cm(1-n)$ or $c(1-m)(1-n)$, and the remaining white area will be $(1-m)(1-c)(1-n)$. Note that although the contributions of the cyan and magenta dots to the individual evaluated proportions of the printed cyan and magenta color components are $c(1-n)$ and $m(1-n)$, respectively, the resultant proportions of these color components are reduced by the degree to which they combine to form blue. The foregoing procedure may be carried one step further to determine the resultant proportions of all components after the yellow dots have also been printed. The results so obtained are given in the following Table I similar to the same tabulation in the above-identified article by Hardy and Wurzburg:

*Table I*

| Printed Color Components | Individually Evaluated Proportions | Resultant Proportions |
|---|---|---|
| Cyan (C) | $C_i=c(1-n)$ | $C=c(1-m)(1-y)(1-n)$ |
| Magenta (M) | $M_i=m(1-n)$ | $M=m(1-c)(1-y)(1-n)$ |
| Yellow (Y) | $Y_i=y(1-n)$ | $Y=y(1-c)(1-m)(1-n)$ |
| Blue (B) | $B_i=cm(1-n)$ | $B=cm(1-y)(1-n)$ |
| Green (G) | $G_i=cy(1-n)$ | $G=cy(1-m)(1-n)$ |
| Red (R) | $R_i=my(1-n)$ | $R=my(1-c)(1-n)$ |
| White (W) | $W_i=1$ | $W=(1-c)(1-m)(1-y)(1-n)$ |
| Grey (L) | $L=cmy(1-n)$ | $L=cmy(1-n)$ |
| Black (N) | $N=n$ | $N=n$ |

Electronic equipment which operates in accordance with the foregoing theoretical principles has previously been developed for indicating or controlling the proper relative areas of the colored ink dots which must be printed in order to match the colors represented by a set of three primary color components of an original picture. In an electronic previewer, however, it is necessary to do just the opposite, namely, to provide signals representing the resultant printed color components which will be produced by a given combination of color dot areas. As indicated, this will establish nine separate variables. It is further necessary to convert or translate such a set of nine signals into the form of a much lesser number of signals for controlling the respective primary color components of light produced by the electronic color-image-reproducing means. This usually means going from the nine variables to only three while still obtaining the same color rendition. It should also be noted that a straightforward approach involving equipment for performing the first of the foregoing previewer operations followed by further equipment for independently performing the second may often be prohibitively complicated and expensive and might lead to severe instability problems. In accordance with the present invention, both of the foregoing functions are carried out in a manner lending itself to an integrated mode of construction which permits minimizing the amount of equipment and the number of nonlinear signal processing operations involved.

CONSTRUCTION OF ELECTRONIC PREVIEWER OF FIG. 1

The utilization of the relationships summarized in Table I in applicant's invention will now be described with reference to the previewer circuit of an embodiment thereof shown in FIG. 1. The previewer is adapted to display an electronic preview color image of the printed color reproduction which will be obtained from an original color picture 13 by printing photo-engraved half-tone color-separation images thereof in pigments of the corresponding colors. The previewer comprises electronic color-image-reproducing means 11 for producing respectively controlled primary color components of light which form the displayed image. It also comprises electro-optical input means 14 for deriving from the original picture 13 electrical signals *c*, *m*, *y* and $-n$ representing the relative areas of the colored half-tone dots which will be printed in each incremental region of the reproduction by respective ones of the color-separation images. Such electro-optical input means may comprise an electronic scanner 15 for cyclically scanning original picture 13 to derive electrical signals $R_0$, $G_0$ and $B_0$ proportional to the light transmissions of respective color components thereof in each incremental region. These color components may conveniently be cyan, magenta and yellow, the ensuing description being given on that basis. It will also be assumed, for convenience, that the printing pigments employed are cyan, magenta, yellow and black inks. Scanner 15 may be of conventional construction, including a cathode-ray tube 17 to project flying spot raster on the original picture and a set of dichoric mirrors 16 for resolving the emergent light therefrom into respective red, green and blue beams which are directed to photocell amplifiers 19R, 19G and 19B. The scanning operation of tube 17 may be controlled by deflection circuits 21 and blanking circuit 23, in accordance with principles well known in the television art.

Electro-optical input means 14 may further include analog signal processing circuit means 25 for receiving the $R_0$, $G_0$ and $B_0$ transmission-representative signals and modifying them in accordance with the relation between the color components represented thereby and the relative areas of the corresponding colored half-tone dots which will be printed in each incremental region of the printed color reproduction of original picture 13. Circuit means capable of performing this operation are shown in FIG. 3 and are substantially the same as that disclosed in the co-pending application of W. F. Bailey, identified above. The resultant electrical output signals *c*, *m*, and *y* produced by analog circuit means 25 will then be proportional to the areas of the cyan, magenta and yellow colored dots in each incremental region of the printed picture. Analog circuit means 25 also produces a phase inverted signal $-n$ proportional to the negative of the area of the black ink dot which will be printed in each such region.

The electronic previewer in FIG. 1 also comprises first signal processing means 35 for combining the individual dot area-representative signals *c*, *m*, *y*, and $-n$ in accordance with the contributions of all dots to the individually evaluated proportions of the color components which will be printed thereby in each such region. The printed color component-representative signals so obtained, designated nated $C_i$, $M_i$, $Y_i$, $G_i$, $R_i$, *L*, $-N$ and $W_i$, are then applied to second signal processing means 45 which combines them to produce signals $R_2$, $G_2$ and $B_2$ for respectively controlling the primary color components of light produced by image-reproducing means 11.

The control signals $R_2$, $G_2$ and $B_2$ are applied to input terminals 11R, 11G and 11B of image-reproducing means 11, which may include, for example, a tricolor television picture tube 27 adapted to produce respective red, green and blue primary color components of light on screen 27a in response to respective signals applied to its terminals 29R, 29G and 29B. The latter terminals are respectively connected to input terminals 11R, 11G and 11B of the complete image-reproducing means by respective gamma corrector circuits 31R, 31G, and 31B, which compensate for the nonlinear relation between the amplitude of a signal applied to any of the tube terminals and the intensity of the corresponding controlled primary color produced on screen 27a. The inputs to the gamma correctors may also include potentiometers to compensate for inequalities in the signal-to-light conversion efficiencies of tube 27 for the different primary colors. Thus, the relative intensities of red, green and blue produced on screen 27a will be linearly proportional to the control signal amplitudes $R_2$, $G_2$ and $B_2$, respectively.

Since these electronically produced primary color components must combine to produce the same color in each incremental region of the displayed image as that produced by the combination of the resultant proportions of the printed color components in the same region of the printed reproduction, the control signals $R_2$, $G_2$ and $B_2$ must be proportioned in accordance with the color matching relationships between the printed color components and the electronically produced primary color components. The signal combination effected by signal processing means 45 is, therefore, in accordance with those relationships. More specifically, such signal combination is carried out in accordance with the total of the relative contributions of all the printed color components to each of the electronically produced primary color components. Image-reproducing means 11 is thus caused to produce the preview electronic color image of the printed color reproduction, formation of the electronic image being effected in synchronism with the scanning of original picture 13 by scanner 15 so as to maintain accurate correspondence of successive incremental regions of the image and the picture. Such synchronous operation may be obtained by respectively connecting deflection circuits 21 and blanking circuit 23 in scanner 15 to the deflection yoke 33 and blanking circuit 34 included in image-reproducing means 11 for conventionally controlling the tricolor tube 27 to produce a rectangular scanning raster on screen *27a*.

CONSTRUCTION OF SIGNAL PROCESSING MEANS 35

Considering now in more detail the construction of signal processing means 35, it receives the electrical signals *c, m, y* and *—n* produced by electro-optical input means 14 respectively representing the areas of the different colored half-tone dots which will be printed in each incremental region of the color reproduction to be previewed. As already stated, in this portion of the previewer these signals are combined in accordance with the contributions of the dots to individually evaluated proportions of the color components which will be printed thereby in each such region. Those proportions are tabulated in the second column of Table I above. To effect such combination, signal processing means 35 may include nonlinear signal-translating circuits for first obtaining signals proportioned to the logarithms of the applied dot area-representative signals. More specifically, these circuits may be the four logarithmic amplifiers 37C, 37M, 37Y and 37N, respectively connected to the output terminals of electro-optical input means 14 to receive the dot area-representative signals *c, m, y* and *—n* therefrom. Since the output of a nonlinear signal-translating circuit depends on the absolute amplitude of the input signal relative to a fixed reference level, each of the foregoing logarithmic amplifiers may include a clamping circuit connected to its input for maintaining a fixed D.-C. potential thereat regardless of the average or D.-C. component of signals applied thereto. A reference potential level of the signals obtained by scanner 15, and so also of the resultant dot area-representative signals, is established during the retrace or "black" intervals of tube 17. Since the black level is set by the blanking pulse amplitude relative to a fixed reference potential which will usually be ground, the clamping circuit of each of logarithmic amplifiers 37C, 37M, 37Y and 37N may be connected to blanking circuit 23 in scanner 15 so as to operate in response to each blanking pulse to then set the direct potential at the input terminal of each amplifier at a fixed level which may be ground in the case of each of amplifiers 37C, 37M and 37Y. In the case of amplifier 37N, however, the clamping potential is at a level corresponding to the maximum signal amplitude. In this way, amplifiers 37C, 37M and 37Y provide output signals proportional to log *c*, log *m* and log *y*, respectively, while amplifier 37N produces an output signal proportional to log (1—*n*). Each of these logarithmic amplifiers may be of the type disclosed in the copending application of Carl R. Wilhelmsen for "Nonlinear Signal-Translating Circuit," Serial No. 803,500, filed April 1, 1959, and assigned to applicant's assignee. Alternatively, any of the wide variety of well known logarithmic signal-translating circuits used in the television art as gamma correctors may be employed. A circuit of this type, employing differently biased diodes, is shown in FIG. 11–11 at page 221 of the textbook, "Principles of Color Television," by the Hazeltine Laboratories Staff, published in 1956 by John Wiley & Sons, Inc.

Signal processing means 35 may also include a linear additive matrix circuit 38 having four input terminals 380, 381, 382, and 383 respectively connected to the output terminals of logarithmic amplifiers 37C, 37M, 37Y, and 37N to receive the logarithmic dot area-representative signals therefrom. This matrix also has seven output terminals 38C, 38M, 38Y, 38B, 38G, 38R, and 38L which are coupled to the appropriate input terminals to effect addition of the input signals in accordance with the contributions of the corresponding colored half-tone dots to individually evaluate proportions of the printed color components formed thereby in the printed color picture. That is, signal addition is effected in accordance with the second column of Table I above so as to obtain signals respectively proportional to the logarithms of C*i*, M*i*, Y*i*, B*i*, G*i*, R*i*, and L at the output terminals having the same identifying letters. For example, the individually evaluated proportion B*i* of the printed blue color component is given in column 2 of Table I as *cm*(1—*n*). The logarithm of B*i* is, therefore, equal to the sum of log *c* plus log *m* plus log (1—*n*). Accordingly, output terminal 38B of matrix 38 is connected to each of the input terminals 380, 381, and 383, so as to obtain the sum of the signals proportional to those quantities respectively applied to the latter terminals. Signal addition may be effected simply by including respective isolating resistors of equal resistance in the different connection paths. The summation signal at output terminal 38B is, therefore, proportional to log *Bi*. Signals. representing the logarithms of the individually evaluated proportions of each of the other colors listed in the second column of Table I are obtained in similar manner at the correspondingly lettered output terminals of matrix circuit 38. Since black (N) and the individual proportion of white (W*i*) are nonchromatic, no signal cross-coupling is required in their case and they are not involved in the operation of matrix 38.

Signal processing means 35 may additionally comprise nonlinear signal-translating output circuits for exponentially translating the logarithmic signals produced by matrix circuit 38, thus obtaining signals proportional to the individually evaluated proportions of printed color components C*i*, M*i*, Y*i*, B*i*, G*i*, R*i*, and L. Such circuits may comprise the exponential amplifiers 39C, 39M, 39Y, 39B, 39G, 39R, and 39L respectively connected to the similarly lettered output terminals of matrix circuit 38. As in the case of the input logarithmic amplifiers 37C, 37M, 37Y, and 37N described above, since an exponential signal-translating characteristic is essentially the inverse of a logarithmic signal-translating characteristic, a conventional gamma corrector of the type used in the television art may be employed. For example, the corrector in FIGS. 11–13 on page 223 of the above-cited textbook, "Principles of Color Television," is shown therein to have a characteristic closely approximating an exponential curve.

In order to provide a complete set of the color component-representative signal, signal processing means 35 also provides at two additonal output terminals 39N and 39W, signals respectively proportional to —N and W*i*. The first of these signals is actually the same as the signal —*n*, and so is available at output terminal 25N of analog circuit 25. That terminal may, therefore, be connected to terminal 39N to provide that signal there at. The other signal W*i*, corresponds to the maximum amplitude of any of the dot area-representative signals during the trace interval and to the black level during the retrace interval. Since the blanking pulse produced by blanking circuit 23 in scanner 15, has such an amplitude, signal W*i* can therefore be obtained by means of the connections 23*b* and 23*a* to the latter circuit. Actually, since this signal amplitude is constant and does not contribute to any other color, its only effect is to establish a reference brightness level on screen 27*a* of image-reproducing means 11. It could, therefore, be applied in equal proportions to each of control terminals 11R, 11G, and 11B of image-reproducing means 11.

CONSTRUCTION OF SIGNAL PROCESSING MEANS 45

The signals *Ci* . . . *Wi* representing the individually evaluated proportions of the printed color components in each incremental region of the printed picture are supplied by signal processing means 35 to the respective input terminals 45C . . . 45W of the second signal processing means 45. The latter serves to combine those signals in accordance with the color matching relationships between the corresponding printed color components and the primnry color components of light produced by image-reproducing means 11 so as to obtain the signals $R_2$, $G_2$, and $B_2$ for respectively controlling the latter color components. In this way, the colors of the displayed electronic image will match the colors of the printed reproduction which will be obtained by the printing process being simulated. More specifically, signal processing means 45 may comprise a first linear matrix circut 47 for combining the printed color component-representative signals *Ci* . . . *Wi* so as to obtain signals representing the resultant proportions thereof as listed in the third column of Table I above. It may also comprise a second linear matrix circuit 49 for then additionally combining those signals in accordance with the total of the relative contributions of all the printed color components to respective ones of the controlled primary color components of light electronically produced by image-reproducing means 11. These two matrices will now be described in detail.

MATRIX 47

The nine input terminals 45C . . . 45W of signal processing means 45 will be the input terminals of matrix circuit 47. The latter also has nine output terminals 47C . . . 47W at which signals in accordance with the resultant proportions of the printed color components are obtained. The manner in which this is effected may be perceived by expanding the expressions in the third column of Table I giving those proportions. When this is done, it is found that each may be expressed as the algebraic difference of respective plus and minus contributions thereto by the individually evaluated color components. For example, the resultant proportion of the cyan printed color component C is given in Table I as $$c(1-m)(1-y)(1-n)$$

Performing the indicated multiplication of the first three terms gives $(c-mc-yc+cmy)(1-n)$. Comparing this with the individually evaluated color component proportions shown in the second column, it is seen that it may be expressed as $(Ci+L)-(Bi+Gi)$. The resultant proportion C of the printed cyan color component is, therefore, the algebraic difference of a plus contribution C+ made thereto less a minus contribution C−, where these algebraic contributions are given by:

$$C+=Ci+L \tag{1}$$

and $$C-=Bi+Gi \tag{2}$$

In terms of the above contributions thereto, the resultant proportion of cyan is:

$$C=(C+)-(C-) \tag{3}$$

By making similar calculations for the resultant proportions of each of the other printed color components, the plus and minus contributions thereto by the individually evaluated proportions of all color components are found to be as listed in the following Table II:

*Table II*

| Printed Color Component | Plus Contribution | Minus Contribution |
|---|---|---|
| C | C+=Ci+L | C−=Bi+Gi |
| M | M+=Mi+L | M−=Ri+Bi |
| Y | Y+=Yi+L | Y−=Ri+Gi |
| B | B+=Bi | B−=L |
| G | G+=Gi | G−=L |
| R | R+=Ri | R−=L |
| W | W+=Wi+Ri+Bi+Gi+(−N) | W−=Ci+Mi+Yi+L |
| L | L+=L | L−=O |
| N | N+=O | N−=−N |

Matrix 47 utilizes the relations set forth in Table II by first combining the individually evaluated color component proportioned signals *Ci* . . . *Wi* to obtain signals respectively corresponding to all the listed algebraic contributions, and then effecting algebraic subtraction thereof to obtain signals in the resultant proportions of all color components. The signal combination may be effected by a linear additive submatrix circuit 46 included in matrix 47 and having output terminals ±46C . . . ±46W at which signals representing each of the listed plus and minus algebraic contributions are obtained by addition of the appropriate signals at input terminals 45C . . . 45W. For example, input terminals 45C and 45L of matrix 47, which will also be input terminals of submatrix 46, may be coupled by respective equal voltage adding resistors to the output terminal +46C thereof. The signal thereat will thus correspond to the sum of *Ci* and L, and so will represent the plus contribution C+ to the resultant proportion C of the printed cyan color component. Similarly, the input terminals 45B and 45G may be coupled by respective equal voltage adding resistors to an output terminal −46C, the signal so obtained representing *Bi*+*Gi* and consequently the minus contribution C− to that color component. All remaining output terminals ±46M . . . ±46W are similarly coupled to the appropriate input terminals to obtain signals representing all the other listed algebraic color contributions. Of course, since the individually evaluated proportions of color components L and N are the same as their resultant proportions, no signal cross-coupling is involved in this case and no dual output signals are derived for them.

To effect the requisite subtraction of the signals representing plus and minus contributions to the resultant proportion of each color component, matrix 47 may also include individual amplifier phase-inverter signal subtractor units respectively connected to the terminals of submatrix 46 at which those signals are produced. The input terminals of the amplifier and phase inverter for each color component are respectively connected to the (+) and (−) submatrix output terminals corresponding thereto. Thus, terminals +46C and −46C are respectively connected to the input terminals of an amplifier (*a*) and phase inverter (*b*). The output terminals of the amplifier and inverter for each color component are both connected by respective resistors to the corresponding output terminal of matrix 47, in this case terminal 47C, so as to effect addition of the signals produced thereby. Since the amplifier output will be proportional to the plus contribution C+, while the phase- inverter output will be proportional to the negative of the minus contribution C−, the signal at matrix output terminal 47C will represent the resultant proportion of the cyan color component as given by Equation 3 above. Similar amplifier phase-inverter signal subtracting units are respectively connected to the (+) and (−) terminal pairs 46M, 46Y, 46B, 46G, 46R, and 46W, the resulting signals being produced at matrix output terminals 47M, 47Y, 47B, 47G, 47R, and 47W. In the case of terminal 47L, no inversion is required since no minus contributions are made to the L color component. Terminal 46L of submatrix 46 is, therefore, directly connected to the foregoing terminal. The signal at output terminal 46N of the submatrix, however, itself represents a minus contribution to the black color component. That terminal is, therefore, connected to output terminal 47N of matrix 47 by way of a phase inverter 471N.

MATRIX 49

Having obtained signals C . . . W in the resultant proportions of the printed color components, they are further combined by the second linear matrix 49 of signal processing means 45 to derive signals $R_2$, $G_2$, and $B_2$ for controlling the respective color components of light produced by image-reproducing means 11 as described above. Matrix 49 has respective input terminals 48C . . . 48W connected to the correspondingly lettered output terminals of the matrix circuit 47 to receive the signals C . . . W. The output terminals of matrix 49 are the output terminals 45R, 45G, and 45B of the composite signal processing means 45, the control signals $R_2$, $G_2$, and $B_2$ being produced thereat. This is achieved by combining the printed color component-representative signals in accordance with the color matching relationships between the corresponding colors and the respectively controlled primary colors produced electronically on screen 27*a* of the image-reproducing means.

The relationships referred to may be determined by first assuming, for example, that only the cyan printed color component is involved and that it has an intensity C and C.I.E. color coordinates $x_p$, $y_p$, and $z_p$. The matching C.I.E. color components are therefore:

$$X_p=x_p \quad Y_p=y_p \quad Z_p=z_p \tag{4}$$

If the three primary colors of light produced on screen 27*a* of image-reproducing means 11 in response to the respective control signals $R_2$, $G_2$, and $B_2$ are red, green, and blue of relative intensities R, G, and B, the matching C.I.E. color components will be given by:

$$X_0=r_xR+g_xG+b_xB \quad Y_0=r_yR+g_yG+b_yB \quad Z_0=r_zR+g_zG+b_zG \tag{5}$$

where the subscripted *r*, *g*, and *b* coefficients are the known C.I.E. color coordinates of the foregoing electronically produced colors. In order to simulate the desired cyan color, it is therefore necessary that:

$$X_0=X_p \quad Y_0=Y_p \quad Z_0=Z_p \tag{6}$$

The right-hand side of each of Equations 5 may be set equal to the right-hand side of the corresponding one of Equations 6, thus giving three simultaneous equations which may be solved for R, G, and B in terms of the product of C by respective combinations of the various C.I.E. coordinates. The results so obtained are as follows:

$$R=\frac{C}{A}[x_p(g_yb_z-g_zb_y)+y_p(g_zb_x-g_xb_z)+z_p(g_xb_y-g_yb_x)] \tag{7a}$$

$$G=\frac{C}{A}[x_p(b_yr_z-b_zr_y)+y_p(b_zr_x-b_xr_z)+z_p(b_xr_y-b_yr_x)] \tag{7b}$$

$$B=\frac{C}{A}[x_p(r_yg_z-r_zg_y)+y_p(r_zg_x-r_xg_z)+z_p(r_xg_y-r_yg_x)] \tag{7c}$$

where A is a constant which is the same in each case and so does not affect the proportions of R, G, and B.

The actual numerical values of the above color matching coefficients of C may be plus or minus in sign depending on the values of the C.I.E. coordinates of the electronically produced primary color components and the printed color component being simulated. For any given intensity C of the cyan printed color component, those coefficients establish the relative proportions of C which must be contributed to the R, G, and B electronic primary color components to display a matching cyan color on screen 27*a* of image-reproducing means 11. For example, suppose that for a particular cyan printing ink and a particular color-television tube 27 in the latter means, the coefficients of $$\frac{C}{A}$$

in Equations 7*a*, 7*b*, and 7*c* are respectively −3, +6, and +8. The relative intensities of the R, G, and B primary color components must then be in the proportions −3:+6:+8, the minus sign for the R component meaning that it must be reduced relative to the value thereof when R, G, and B are proportioned to match the C.I.E. standard white color.

The foregoing procedure is applicable to each of the nine printed primary color components C . . . W, Equations 7 above being applicable in each case so long as $x_p$, $y_p$, and $z_p$ are the C.I.E. coordinates for the particular printed color component involved.

The above colorimetric analysis is applicable to the construction of matrix 49 by virtue of the fact that the signals C . . . W respectively applied thereto are in the resultant proportions of the corresponding printed color component intensities, while the primary color components of the light produced by image-reproducing means 11 will respectively be controlled by the signals $R_2$, $G_2$, and $B_2$ obtained at matrix output terminals 45R, 45G, and 45B. Matrix 49 can therefore produce the requisite proportioning of those control signals by additively combining at each of its output terminals proportions of the various input signals in accordance with the relative contributions of the corresponding printed color components to the electronic color component to be controlled by the signal at that terminal. Each such contribution will be given by the color matching coefficient as determined from Equations 7 for the printed and electronic color components involved. Since image-reproducing means 11 is constructed so the $R_2$, $G_2$, and $B_2$ control signals respectively produce linearly proportional intensities of red, green, and blue light on screen 27*a*, as described above with reference to gamma correctors 31R, 31G, and 31B, the additive signal combination effected by matrix 49 will also be linear. Of course, even if the control signal vs. light intensity relations should be nonlinear, corresponding nonlinear signal addition could still be achieved either by cross-coupling appropriate ones of the signals C . . . W prior to addition or by means of nonlinear signal adding elements. In any case, the three additive primary color components displayed on screen 27*a* in response to the control signals $R_2$, $G_2$, and $B_2$ will produce a resultant color matching that of the nine subtractive color components of the printed color picture in each incremental region.

A particular construction of matrix 49 may include a linear additive submatrix 48, the input terminals of which are the matrix input terminals 48C . . . 48W and having pairs of (+) and (−) output terminals ±49R, ±49G, and ±49B. Each input terminal is connected to either the (+) or (−) one of each pair of output terminals, as determined by the signs of the color matching coefficient given by Equations 7 for the printed color component represented by the input signal and the electronically displayed color component corresponding to the particular pair of output terminals. For example, if the numerical values of the color matching coefficients for the cyan printed color components are found to be −3, +6, and +8, as above, input terminal 48C would be connected to output terminals −49R, +49G, and +49B. In addition, the submatrix connecting paths may include resistors proportioned in accordance with the reciprocals of the values of the color matching coefficients respectively applicable to those paths. This will achieve voltage addition of all signals applied to each output terminal. Thus, in the above example, the input terminal 48C would be connected to the output terminal −49R, +49G, and +49B by resistors having resistances in the proportions ⅓:⅙:⅛.

The (+) and (−) components of each of the control signals $R_2$, $G_2$, and $B_2$, as obtained at the respective pairs of output terminals of submatrix 48, are then combined by signal subtractor units 491R, 491G, and 491B respectively connected to those terminal pairs. Each subtractor unit may comprise an amplifier and phase inverter of the type described above with reference to matrix 47. The units 491R, 491G, and 491B thus produce the requisite control signals $R_2$, $G_2$, and $B_2$ at output terminals 45R, 45G, and 45B of the complete signal processing means 45.

FIG. 2 MODIFICATION OF SIGNAL PROCESSING MEANS 45

It will be noted that in FIG. 1 the signal processing means 45 is constructed to require ten amplifier phase-inverter subtractor units as well as a phase inverter in matrix 47. Such equipment may involve considerable expense. In addition, a considerable degree of maintenance may be necessary to keep so many active circuits in proper operation. Accordingly, as shown in FIG. 2, a preferable construction is to provide duplicate sets of (+) and (−) signal cross-coupling paths in a matrix 490 corresponding to matrix 49 in FIG. 1 and to dispense with all subtractors and phase inverters in the preceding matrix 470 corresponding to matrix 47.

Matrix 470 in FIG. 2 may be the same as submatrix 46 in FIG. 1, the signals representing (+) and (−) contributions to the resultant proportions of the printed color components C . . . W being produced at its respective pairs of output terminals 470C . . . 470W. Signals representing the (−) contribution to black (N) and the (+) contribution to grey (L) are also produced at terminals −470N and +470L, respectively. These signals are then respectively applied to the corresponding input terminals ±480C . . . ±480W, −480N and +480L of matrix 490. The latter matrix may include a submatrix 480 corresponding to submatrix 48 in FIG. 1, the input terminals of submatrix 480 being the input terminals of matrix 490. Submatrix 480 also contains three pairs of output terminals ±490R, ±490G, and ±490B. The connections between each (+) input terminal and the various output terminals thereof may be the same as in submatrix 48 in FIG. 1. Each (−) input terminal of submatrix 480 is also coupled to all output terminals in a similar manner to the associated (+) input terminal, the proportioning of the requisite additional coupling resistors being the same as for the (+) terminals. However, for a (−) input terminal, the coupling for a (+) colorimetric coefficient will be to the (−) one of the appropriate pair of output terminals and the coupling for a (−) colorimetric coefficient will be to the (+) one thereof. Specifically, assume as before that the colorimetric coefficients for the contributions of the cyan printed color component to the red, green, and blue controlled primary colors produced by image-reproducing means 11 are in the proportions −3:+6:+8. The input terminal +480G is then coupled to output terminals −490R, +490G, and +490B, as in FIG. 1. The resistors in these coupling paths will have resistances in the ratios ⅓:⅙:⅛. The input terminal −480C, however, will be coupled to output terminals +490R, −490G, and −490B by three additional resistors respectively equal to those for the associated opposite polarity output terminals. Note that this dispenses with the need for two successive negations of a signal representing a minus contribution (such as C−) to a printed color component which, in turn, makes a (−) contribution to a given electronically displayed color component.

The signals so obtained at the three pairs of output terminals ±490R, ±490G, and ±490B of submatrix 480 in FIG. 2 are then combined in the same manner as the output signals from submatrix 48 in FIG. 1, the control signals $R_2$, $G_2$, and $B_2$ being obtained by negation of the signals at the (−) output terminals and addition thereof to the signals at the associated (+) output terminals as before via subtractor units 491R, 491G, and 491B. These signals will be the same as in FIG. 1, but will be produced more simply and economically due to integration of the signal processing for simulating the combination of the individually evaluated proportions of the printed color components into the resultant proportions thereof and for simulating the further combination of those color components to form respectively primary color components the same as those produced by image-reproducing means 11.

It is evident that since matrices 470 and 480 are simple linear circuits in cascade, they can readily be combined into a single linear additive matrix. Such construction may be easily determined by matrix algebra computations of the type employed above.

ANALOG SIGNAL PROCESSING CIRCUIT OF FIG. 3

It was indicated above that analog signal processing circuit 25 in electro-optical input circuit 14 of the previewer in FIG. 1 may be substantially of the type disclosed in the copending application of William F. Bailey, Serial No. 854,742, filed November 23, 1959, which matured into Patent No. 3,123,666, March 3, 1964. For a complete description of that circuit, reference should be made thereto. However, in the interest of completeness, the essential aspects thereof have been illustrated by FIGS. 3–5, inclusive, and will now be described.

As illustrated in FIG. 3, the red, green, and blue color transmission-representative signals $R_0$, $G_0$, and $B_0$, which are obtained from the original color picture 13 by scanner 15, are respectively applied to input terminals 251, 252, and 253 of the complete analog circuit. These terminals are connected to respective nonlinear signal compression amplifiers 63R, 63G, and 63B via the level control potentiometers 40R, 40G, and 40B. These amplifiers serve to modify the color-representative signals applied thereto in accordance with the degree of tone compression performed in the actual color printing process. Since a variety of tone compression characteristics may actually be employed, each amplifier may be constructed to provide a corresponding variety of nonlinear gain characteristics which are selectable at respective settings (such as A, B, C, and D) of the schematically indicated control switches 64R, 64G, and 64B for the amplifiers. The relative signal levels over which the selected gain characteristic extends may then be controlled by the level-setting potentiometers 40R, 40G, and 40B. A specific type of amplifier circuit for such operation may simply include a number of differently biased diodes as in the gamma corrector amplifier circuit shown in FIG. 11—11 at page 221 of the textbook, "Principles of Color Television." Alternatively, the novel circuit of the above-identified copending application of Carl R. Wilhelmsen, Serial No. 803,500, may be employed. The output signals $R_c$, $G_c$, and $B_c$ from compression amplifiers 63R, 63G, and 63B thus represent the transmissions of original picture 13 as modified in order to compensate for the more limited tonal range obtainable in the printed color reproduction.

The compressed signals are then respectively applied to logarithmic amplifiers 65R, 65G, and 65B which logarithmically translate them to obtain signals proportional to $+\log R_c$, $+\log G_c$, and $+\log B_c$ at their plus (+) output terminals, and signals proportional to $-\log R_c$, $-\log G_c$, and $-\log B_c$ at their minus (−) output terminals. Each logarithmic amplifier may be of the same type as those described above with reference to amplifiers 37C . . . 37N in FIG. 1, with the addition of a linear phase inverter where necessary to obtain sign reversal.

The signals at the (−) output terminals will be proportional to the total effective cyan, magenta, and yellow densities of original picture 13, and so have been designated $+C_1$, $+M_1$, and $+Y_1$. The signals at the (+) output terminals will be proportional to the total densities of respective red, green, and blue color separation prints of the original picture, such as masks made therefrom, and so have been designated $-C_1$, $-M_1$, and $-Y_1$.

All the foregoing density-representative signals are applied to respective input terminals of a color masking matrix circuit 67 which cross-couples them to a degree simulating the color component cross-coupling effected by the masking operations carried out in the actual color printing process in order to obtain corrected photographic color-separation images of the original picture 13. This circuit may simply comprise a network of resistors by which each input signal is coupled to each of its three output terminals 67C, 67M, and 67Y, such resistors being proportioned the same as the relative masking percentages in the printing process. The corrected signals $C_2$, $M_2$, and $Y_2$ at those terminals are thus respectively proportional to the densities of red, green, and blue negative color-separation images of a tone compressed and color-corrected original picture 13.

As shown in FIG. 3, signals $C_2$, $M_2$, and $Y_2$ are respectively conveyed to one set of input terminals 68C, 68M, and 68Y of a black signal calculator circuit 68. This circuit also has three additional input terminals 68R, 68G, and 68B at which it receives the tone compressed transmission-representative signals $R_c$, $G_c$, and $B_c$ from compression amplifiers 63R, 63G, anr 63B. From all these signals a signal N is produced at output terminal 69N representing the density of a black color-separation negative image of the corrected original picture 13. The construction of black signal calculator 68 is based on the fact that the amount of black ink to be printed in any incremental region of the printed color reproduction is dependent on the degree to which the cyan, magenta, and yellow ink dots therein all overlap. Since equal superimposed quantities of these inks should produce black, the maximum possible black density in any such region is therefore proportional to the density of the colored ink which is present in least amount. In terms of signals $C_2$, $M_2$, and $Y_2$, the largest of these represents the density of the most dense color-separation negative image, and so also the area of the smallest colored ink dot in the printed color reproduction. The signal N representing the black-separation negative density may therefore be obtained by deriving a fraction of the foregoing maximum color density signal.

In accordance with the foregoing principles, black signal calculator 68 derives the signal N representing the density of a black-separation negative image of original picture 13, as corrected, by determining the maximum one of signals $C_2$, $M_2$, and $Y_2$ and then obtaining a percentage thereof in accordance with the percentage of maximum possible black density which is actually reproduced as black in each incremental region of the printed color reproduction. Such percentages are usually determined in accordance with black printing characteristics such as those illustrated by curves A and B in FIG. 4. Curve A represents a printed black ink density percentage approximately proportional to the maximum possible printed black density. The actual printed black density is therefore roughly proportional to the square of the density of the least dense printed color. The density of the corresponding black-separation negative for preparing the printed reproduction therefore resembles a squareroot function of the density of the most dense color-separation negative. An analogous signal-translation characteristic is illustrated in curve A′ in FIG. 4*a*.

Another type of black ink deposition characteristic is illustrated by curve B in FIG. 4, corresponding to maintaining a substantially constant minimum value of black density in highlight regions wheren the densty of the least dense printed colored ink remains below a level of about unity. The corresponding signal-translation characteristic is shown by curve B′ in FIG. 4*a*. Still other black printing characteristics may be employed, each requiring a different nonlinear signal-translation characteristic. Black signal calculator 68 may be designed to include circuits which can be adjusted to provide any of those characteristics, the appropriate one in a particular case being selectable by means of a control switch indicated schematically by switch 71 in FIG. 3.

A specific type of black signal calculator circuit is shown in FIG. 5 and has input terminals 68C, 68M, and 68Y at which the signals $C_2$, $M_2$, and $Y_2$ are received. These terminals are respectively connected to the grids of three cathode followers 51C, 51M, and 51Y which share a common output resistor 53. The voltage across this resistor will be substantially proportional to the largest of the foregoing signals, and is translated by a nonlinear amplifier 54 to black signal calculator output terminal 69M. Amplifier 54 may be a conventional gamma corrector including differently biased diodes as shown in FIG. 11—11 on page 221 of "Principles of Color Television," identified above. It may also be adjustable by means of the control switch 71 to produce any of the transfer characteristics shown by curves A′ and B′ in FIG. 4*a* or further variations thereof which may be applicable to a particular color printing process.

An additional color printing system which is simulated by the black signal calculator circuit of FIG. 5 involves improvement of the contrast in shadow regions by reducing the density of black printed therein. This corresponds to increasing the density of the black-separation negative. Since the signals $R_c$, $G_c$, and $B_c$ produced by tone compression amplifiers 63R, 63G, and 63B in FIG. 3 are proportional to the red, green, and blue transmissions of the tone and color-corrected original picture 13, an "ortholuminous" signal representing the composite brightness thereof may be obtained by adding those signals together in proportion to the relative luminances of the corresponding colors. This composite signal will be of high amplitude in highlight regons of the prnted reproducton and will decrease in middle tone and shadow regions. Such signal addition is effected by translating the signals $R_c$, $G_c$, and $B_c$ via respective resistors 55R, 55G, and 55B to the grid of a vacuum tube cathode follower 56. The ortholuminous summation signal is obtained at the cathode thereof, and is translated via a nonlinear amplifier 57 to the output terminal 69N where it adds to the signal produced by amplifier 54. Amplifier 57 may have a signal-translation characteristic of the type shown by curve 57A adjacent thereto, whereby it provides high signal gain at low signal levels corresponding to shadow regions and a gradually reducing signal gain up to essentially zero at high signal levels corresponding to highlight regions. This type of signal-translation characteristic is substantially logarithmic, so that amplfier 57 may be substantially the same as amplifier 54.

The resultant output signal N at black signal calculator output terminal 69N will be proportional to the density of a black color-separation negative image of the corrected original picture 13. To take account of the undercolor removal operation involved in the actual color printing process, this signal is applied to one input terminal of each of three matrices 81C, 81M, and 81Y which respectively subtract it from the $C_2$, $M_2$, and $Y_2$ signals applied to the remaining input terminal of each of those matrices, respectively. The resulting difference signals $C_3$, $M_3$, and $Y_3$ then represent the densities of completely corrected color-separation images of original color picture 13, including elimination of density variations due to brightness variations which will be accounted for by the black-separation negative. Each of matrices 81C, 81M, and 81Y may simply comprise a phase inverter for inverting the polarity of signal N to obtain a −N signal, and a resistive adding network for adding the $-N$ signal to the color-separation density-representative signal applied to the matrix. The relative sizes of the resistors employed will govern the proportion of signal N which is subtracted, corresponding to a given degree of undercolor removal. If necessary, in order to simulate a nonlinear undercolor removal characteristic, nonlinear subtraction may be provided either by nonlinearly modifying the N signal or nonlinearly translating the signal from which it is subtracted.

The signal N is also applied to nonlinear amplifier 83N, the signals $C_3$, $M_3$, and $Y_3$ being applied to further nonlinear amplifiers 83C, 83M, and 83Y. These amplifiers have signal-translation characteristics which simulate the highlight boost characteristic employed for the corresponding colors in the actual color printing process. That is, each provides increased signal amplification at increasingly higher signal levels in order to simulate the increased degree of exposure which is provided in highlight regions of original color picture 13 in preparing color-separation negatives therefrom in the actual printing process. These amplifiers will thus have a generally exponential signal-translation characteristic, and may each be of the same type as amplifiers 39C . . . 39L described above in FIG. 1. The signals $C_4$, $M_4$, $Y_4$, and $N_1$ obtained therefrom will thus be respectively proportional to the densities of cyan, magenta, yellow, and black color-separation negatives of original color picture 13 as modified in order to compensate for substantially all of the color reproduction deficiencies of the actual color printing process.

The remaining portions of the electronic analog processing circuit of FIG. 3 provide signal-translation characteristics which simulate rigidly standardized color printing operations for developing the corrected color-separation negatives, preparing contact prints thereof, deriving half-tone color-separation negatives, exposing and etching the corresponding printing plates, and obtaining inked impressions of the individual printing plate images. Thus, signals $C_4$, $M_4$, $Y_4$ and $N_1$ are first respectively applied to nonlinear amplifiers 85C, 85M, 85Y, and 85N which simulate the $D$ vs. log $E$ devolopment characteristic of the exposed negative film plates which are employed in the actual color printing process for obtaining red, green, blue, and black color-separation negative photographs of the corrected original picture. Over a considerable range these characteristics will be linear, having slopes equal to the negative film gamma. However, the curved "toe" and "shoulder" regions of the film characteristics will normally require a certain degree of nonlinear signal-translation at low and high signal amplitude levels. Such nonlinearity may readily be provided by nonlinear amplifier circuits of the type previously referred to.

The resultant signals $C_5$, $M_5$, $Y_5$, and $N_2$ obtained at the outputs of the $D$ vs. log $E$ amplifiers will be respectively proportional to the densities of the color-corrected cyan, magenta, yellow, and black-separation negatives which will actually be obtained in the color printing process being simulated. These signals are respectively applied to phase inverters 87C, 87M, 87Y, and 87N, which simulate the change from the corresponding negative photographs to contact prints thereof. A simple phase inversion is adequate because the low contrast of the contact print results in a substantially linear $D$ vs. log $E$ development characteristic. The resultant signals $C_6$, $M_6$, $Y_6$, and $N_3$ are then translated by a set of logarithmic amplifiers 89C, 89M, 89Y, and 89N which have signal-translation characteristics simulating the $D$ vs. log $E$ characteristics of the screened negative film which is employed in the color printing process to obtain half-tone corrected color-separation negative photographs from the contact prints of the original picture. Since these characteristics will be substantially logarithmic, conventional logarithmic amplifiers may be employed.

The resultant half-tone separation negative density-representative signals $C_7$, $M_7$, $Y_7$, and $N_4$ obtained from amplifiers 89C, 89M, 89Y, and 89N are then applied to respective nonlinear amplifier 91C, 91M, 91Y, and 91N. In the copending application of William F. Bailey, identified above, these amplifiers have signal-translation characteristics simulating the relation between half-tone separation negative density and reflection density of the inked impression obtained from the printing plate prepared therefrom in the actual color printing process. Such a characteristic is therefore a composite of the characteristics of the operations of preparing printing plate images from the half-tone photographic images, inking the plates, and laying down individual inked impressions of the printing plate images on printing paper. For use in the present invention, however, the required signal-translation characteristic is of the same form as the relation between half-tone separation negative density and the area of the resultant ink dot which will be printed by the printing plate prepared therefrom. This comprises the same printing operations, but involves the empirically obtained relation between the density of the photographic negative and dot size on the photo-engraved printing plate obtained therefrom. For greatest accuracy, it should also include the relation between the photo-engraved dot size and the actual size of the ink dot which will be printed thereby.

Establishment of the requisite over-all nonlinear characteristic for signals $C_7$, $M_7$, $Y_7$, and $N_4$ is achieved by means of nonlinear amplifiers 91C, 91M, 91Y, and 91N such as those referred to above at pages 221 and 223 of "Principles of Color Television." Amplifier 91N may also be designed to provide phase inversion of the signal $N_4$. The outputs of these amplifiers are then respectively conveyed via potentiometers 93C, 93M, 93Y, and 93N to the output terminals 25C, 25M, 25Y, and 25N of the entire analog processing circuit, which are connected to the complete electronic previewer as shown in FIG. 1. The signals at these output terminals represent the $c$, $m$, $y$, and $-n$ dot areas as are required to be supplied to signal-processing circuit 35 in FIG. 1.

It should be noted that many of the nonlinear operations involved in the analog signal processing circuit of FIG. 3 subsequent to the undercolor removal matrices 81C, 81M, and 81Y are all in cascade and that no subsequent signal cross-coupling exists between the various channels. It is thus possible to combine some or all of those and the ensuing stages in the respective channels into a single nonlinear signal-translating unit. Also, the logarithmic signal-translating function performed by amplifiers 37C, 37M, 37Y, and 37N connected to the input terminals of cross-coupling means 35 in FIG. 1 could actually be combined with one or more of those nonlinear signal-translating stages of the described analog signal processing circuit.

UTILIZATION OF THE ELECTRONIC PREVIEWER

In view of the considerable number of nonlinear characteristics involved, it is desirable to provide means for assuring stable operation of the electronic previewer of FIG. 1. The most important factor in assuring stabilization is that the signals $R_0$, $G_0$, and $B_0$ supplied to analog signal processing circuit 25 be rendered independent of variations in the light output of cathode-ray tube 17 in scanner 15 and of variations in the signal conversion and gain characteristics of the photocell amplifiers 19R, 19G, and 19B therein. As described in the copending joint application of William F. Bailey, applicant, and Ian G. MacWhirter, Serial No. 678,190, filed August 14, 1957, this may be accomplished by establishing a raster on the screen of cathode-ray tube 17 somewhat larger than that required to scan color picture 13. This will allow a path for the scanning beam to bypass the picture at the end of each scanning line prior to retrace. The consequent voltage pulse obtained from each of photocell amplifiers 19R, 19G, and 19B will then have an amplitude proportional to the over-all product of the intensity of the light from cathode-ray tube 17 and the signal gains of that photocell amplifier. Each such reference pulse may be applied to a differential feedback circuit in each channel which responds thereto to establish a control voltage proportional to the pulse amplitude. This control voltage is then degeneratively fed back either to the photocell amplifier or the intensity control electrode of cathode-ray tube 17 so as to compensate for variations theerin.

When the electronic previewer of FIG. 1 is employed to control a given color printing process, it is preferable to have available as a comparison standard an original color picture from which a high quality printed reproduction has previously been obtained by such process. The original picture is placed in scanner 15 and the resulting electronic color image displayed on screen *27a* of image-reproducing means 11 is compared in appearance with the specimen printed reproduction. Any difference between the two is then reduced to achieve substantial identity by adjusting the various controls of analog processing circuit 25. For example, the particular type of analog processing circuit shown in FIG. 3 permits adjusting the electronic image for color balance and density by means of the input level setting potentiometers 40R, 40G, and 40B. The compressor amplifier controls 64R, 64G, and 64B permit contrast adjustment. The black signal calculator control 71 permits adjustment for the degree of black printing employed. The various nonlinear signal-translating characteristics of the nonlinear amplifiers in the circuit may also be adjusted for close color matching. In addition, the degree of highlight boost effected by nonlinear signal-translating circuits 83C, 83M, 83Y, and 83N and also that effected by the nonlinear stages 89C . . . 89N and 91C . . . 91N may be set for the particular highlight boost, screening, and photo-engraving characteristics of the printing process employed.

Having accomplished this initial setup adjustment, an original color picture which is to be printed may be substituted in scanner 15 in place of the standard picture. The resulting electronic image on screen *27a* if image-reproducing means 11 is then observed, and the controls of analog signal processing circuit 25 are adjusted until a desired appearance of the image is obtained. If the color masking percentages in the printing process are variable, the various resistor ratios in the color masking matrix 67 included in analog processing circuit 25 may also be adjusted to still further improve the appearance of the electronic image. In this case, corresponding masking percentages will be employed in the printing process. The degree of highlight boost effected by amplifiers 83C, 83M, and 83Y may also be varied, a corresponding degree of boost then being required in the printing process. The degree of tone compression, black-separation negative density, and color-separation negative exposures in the actual color printing process are then changed from the values applicable to the standard color print in proportion to the degree to which the adjustments of the various previewer controls were changed to obtain an optimum appearance of the electronic image. This will include the compressor amplifier controls, the black signal calculator control, and the signal input level potentiometer settings, respectively. These controls may be calibrated in terms of the units employed in the printing process for measuring the foregoing factors. Having been so adjusted in correspondence with the previewer controls, the printing process can then be relied on to produce from the original color picture 13 a printed reproduction having substantially the same desired appearance as that of the electronic preview image which had been displayed on the screen of electronic image-reproducing means 11.

While the invention has been described with reference to various particular embodiments thereof, it will be apparent to those skilled in the art of electronic colorimetry that many alternatives and modifications thereof may be employed without departing from the true teachings and scope of the invention as defined by the ensuing claims.

What is claimed is:

1. An electronic previewer for displaying an electronic preview color image of the printed color reproduction which will be obtained from an original color picture by printing photo-engraved half-tone color-separation images thereof in pigments of the corresponding colors, said previewer comprising: electronic color-image-reproducing means for producing respectively controlled primary color components of light which form said displayed electronic image; electro-optical input means for deriving from said original picture electrical signals representing the relative areas of the colored half-tone dots which will be printed in each incremental region of said color reproduction by respective ones of said color-separation images; first signal processing means for combining the individual dot area-representative signals in accordance with the contributions of all dots to the individually evaluated proportions of the color components which will be printed thereby in each of said regions; and second signal processing means for combining the printed color component-representative signals to produce signals for respectively controlling said primary color components of light produced by said electronic image-reproducing means, such signal combination being in accordance with the color matching relationships between said printed color components and said electronically produced primary color components; whereby the control signals so obtained are adapted to respectively control said electronically produced color components so that said image-reproducing means displays said preview electronic color image.

2. An electronic previewer for displaying an electronic preview color image of the printed color reproduction which will be obtained from an original color picture by printing photo-engraved half-tone color-separation images thereof in pigments of the corresponding colors, said previewer comprising: electronic color-image-reproducing means for producing respectively controlled primary color components of light which form said displayed electronic image; electro-optical input means for deriving from said original picture electrical signals representing the relative areas of the colored half-tone dots which will be printed in each incremental region of said color reproduction by respective ones of said color-separation images; first signal processing means for combining the individual dot area-representative signals in accordance with the contributions of all dots to the individually evaluated proportions of the color components which will be printed thereby in each of said regions; and second signal processing means for combining the printed color component-representative signals to produce signals for respectively controlling said primary color components of light produced by said electronic image-reproducing means, such signal combination being in accordance with the total of the relative contributions of all said printed color components to respective ones of said electronically produced primary color components; whereby the control signals so obtained are adapted to respectively control said electronically produced color components so that said image-reproducing means displays said preview electronic color image.

3. An electronic previewer for displaying an electronic preview color image of the printed color reproduction which will be obtained from an original color picture by printing photo-engraved half-tone color-separation images thereof in pigments of the corresponding colors, said previewer comprising: electronic color-image-reproducing means for producing respectively controlled primary color components of light which form said displayed electronic image; electro-optical input means for deriving from said original picture electrical signals representing the relative areas of the colored half-tone dots which will be printed in each incremental region of said color reproduction by respective ones of said color-separation images; first signal processing means for combining the individual dot area-representative signals in accordance with the contributions of all dots to the individually evaluated proportions of the color components which will be printed thereby in each of said regions; and second signal processing means for combining the printed color component-representative signals to produce signals for respectively controlling said primary color components of light produced by said electronic image-reproducing means, such signal combination being in accordance with the contributions of the corresponding individually evaluated printed color component proportions to the resultant proportions thereof and further in accordance with the total of the relative contributions of all said printed color components to respective ones of said electronically produced primary color components; whereby the control signals so obtained are adapted to respectively control said electronically produced color components so that said image-reproducing means displays said preview electronic color image.

4. An electronic previewer for displaying an electronic preview color image of the printed color reproduction which will be obtained from an original color picture by printing photo-engraved half-tone color-separation images thereof in pigments of the corresponding colors, said previewer comprising: electronic color-image-reproducing means for producing respectively controlled primary color components of light which form said displayed electronic image; electro-optical input means for deriving from said original picture electrical signals representing the relative areas of the colored half-tone dots which will be printed in each incremental region of said color reproduction by respective ones of said color-separation images; first signal processing means for combining the individual dot area-representative signals in accordance with the contributions of all dots to the individually evaluated proportions of the color components which will be printed thereby in each of said regions; second signal processing means including a first matrix circuit for combining the printed color component-representative signals in accordance with the relative contributions of the corresponding individually evaluated printed color component proportions to the resultant proportions thereof; and a second matrix circuit further included in said second signal processing means for combining the signals representing the resultant proportions of said printed color components in accordance with the total of the relative contributions of all those components to respective ones of said primary color components of light produced by said electronic image-reproducing means; whereby the combined signals so obtained are adapted to respectively control said electronically produced primary color components so that said image-reproducing means displays said preview electronic color image.

5. An electronic previewer for displaying an electronic color image of the printed color reproduction which will be obtained from an original color picture by printing photo-engraved half-tone subtractive color-separation images thereof in pigments of corresponding subtractive colors, said previewer comprising: electronic color-image-reproducing means for producing respectively controlled additive primary color components of light which form said displayed electronic image; electro-optical input means for deriving from said original picture electrical signals representing the relative areas of the subtractively colored half-tone dots which will be printed in each incremental region of said color reproduction by respective ones of said color-separation images; first signal processing means for combining the individual dot area-representative signals in proportion to the relative contributions of all dots to the individually evaluated proportion of the subtractive color components which will be printed in each of said regions by each of said dot colors and all combinations thereof; and second signal processing means for combining the subtractive printed color component-representative signals to produce signals for respectively controlling said additive primary color components of light produced by said electronic image-reproducing means, such signal combination being in accordance with the color matching relationships between said subtractive printed color components and said electronically produced additive primary color components; whereby the control signals so obtained are adapted to respectively control said electronically produced color components so that said image-reproducing means displays said preview electronic color image.

6. An electronic previewer for displaying an electronic color image of the printed color reproduction which will be obtained from an original color picture by printing photo-engraved half-tone subtractive color-separation images thereof in pigments of corresponding subtractive colors, said previewer comprising: electronic color-image-reproducing means for producing respectively controlled additive primary color components of light which form said displayed electronic image; electro-optical input means for deriving from said original picture electrical signals representing the relative areas of the subtractively colored half-tone dots which will be printed in each incremental region of said color reproduction by respective ones of said color-separation images; first signal processing means for combining the individual dot area-representative signals in proportion to the relative contributions of all dots to the individually evaluated proportions of the subtractive color components which will be printed in each of said regions by each of said dot colors and all combinations thereof; second signal processing means including a first matrix circuit for combining the subtractive printed color component-representative signals in accordance with the relative contributions of the corresponding individually evaluated printed color component proportions to the resultant proportions thereof; and a second matrix circuit further included in said second signal processing means for combining the signals representing the resultant proportions of said subtractive printed color components in accordance with the total of the relative contributions of all said printed color components to respective ones of said electronically produced additive primary color components; whereby the combined signals so obtained are adapted to respectively control said electronically produced primary color components so that said image-reproducing means displays said preview electronic color image.

7. An electronic previewer for displaying an electronic color image of the printed color reproduction which will be obtained from an original color picture by printing photo-engraved half-tone cyan, magenta, yellow, and black subtractive color-separation images thereof in correspondingly colored inks, said previewer comprising: electronic color-image-reproducing means for producing respectively controlled red, green, and blue additive primary color components of light which form said displayed electronic image; electro-optical input means for deriving from said original picture electrical signals representing the relative areas of the cyan, magenta, yellow, and black half-tone dots which will be printed in each incremental region of said color reproduction by respective ones of said color-separation images; first signal processing means for combining the individual dot area-representative signals in proportion to the relative contributions of all dots to the individually evaluated proportions of the nine subtractive color components which will be printed in each of said regions by each of said dot colors and all combinations thereof; second signal processing means including a first matrix circuit for combining the subtractive printed color component-representative signals in accordance with the relative contributions of the corresponding individually evaluated printed color component proportions to the resultant proportions thereof; and a second matrix circuit further included in said second signal processing means for combining the signals representing the resultant proportions of said subtractive printed color components in accordance with the total of the relative contributions of all said printed color components to respective ones of said electronically produced additive primary color components; whereby the combined signals so obtained are adapted to respectively control said electronically produced primary color components so that said image-reproducing means displays said preview electronic color image.

8. An electronic previewer for displaying an electronic preview color image of the printed color reproduction which will be obtained from an original color picture by printing photo-engraved half-tone color-separation images thereof in pigments of the corresponding colors, said previewer comprising: electronic color-image-reproducing means for producing respectively controlled primary color components of light which form said displayed electronic image; electro-optical input means for deriving from said original picture electrical signals representing the relative areas of the colored half-tone dots which will be printed in each incremental region of said color reproduction by respective ones of said color-separation images; first signal processing means for combining the individual dot area-representative signals in accordance with the contributions of all dots to the individually evaluated proportions of the color components which will be printed thereby in each of said regions; second signal processing means including a first linear matrix circuit for combining the printed color component-representative signals in accordance with the plus and minus relative contributions, respectively, of the corresponding individually evaluated printed color component proportions to the resultant proportions thereof; and a second matrix circuit further included in said second signal processing means for combining the signals representing resultant proportions of said printed color components in accordance with the total of the relative contributions of all those components to respective ones of said primary color components of light produced by said electronic image-reproducing means; whereby the combined signals so obtained are adapted to respectively control said electronically produced primary color components so that said image-reproducing means displays said preview electronic color image.

9. An electronic previewer for displaying an electronic preview color image of the printed color reproduction which will be obtained from an original color picture by printing photo-engraved half-tone color-separation images thereof in pigments of the corresponding colors, said previewer comprising: electronic color-image-reproducing means for producing respectively controlled primary color components of light which form said displayed electronic image; electro-optical input means for deriving from said original picture electrical signals representing the relative areas of the colored half-tone dots which will be printed in each incremental region of said color reproduction by respective ones of said color-separation images; first signal processing means for combining the individual dot area-representative signals in accordance with the contributions of all dots to the individually evaluated proportions of the color components which will be printed thereby in each of said regions; second signal processing means including a first linear matrix circuit for combining the printed color component-representative signals in accordance with the plus and minus relative contributions, respectively, of the corresponding individually evaluated printed color component proportions to the resultant proportions thereof; and a second matrix circuit further included in said second signal processing means by which the signals representing said plus and minus contributions to the resultant proportions of said printed color components are algebraically combined in accordance with the algebraic combination of respective total plus and minus relative contributions of all said printed color components to respective ones of said electronically produced primary color components; whereby the combined signals so obtained are adapted to respectively control said electronically produced primary color components so that said image-reproducing means displays said preview electronic color image.

10. An electronic previewer for displaying an electronic preview color image of the printed color reproduction which will be obtained from an original color picture by printing photo-engraved half-tone color separation images thereof in pigments of the corresponding colors, said previewer comprising: electronic color-image-reproducing means for producing respectively controlled primary color components of light which form said displayed electronic image; electro-optical input means for deriving from said original picture electrical signals representing the relative areas of the colored half-tone dots which will be printed in each incremental region of said color reproduction by respective ones of said color-separation images; first signal processing means for combining the individual dot area-representative signals in accordance with the contributions of all dots to the individually evaluated proportions of the color components which will be printed thereby in each of said regions; second signal processing means including a first linear matrix circuit for combining the printed color component-representative signals in accordance with the plus and minus relative contributions, respectively, of the corresponding individually evaluated printed color component proportions to the resultant proportions thereof; a second matrix circuit further included in said second signal processing means, said second matrix circuit comprising a linear additive submatrix circuit by which the signals representing said plus and minus contributions to the resultant proportions of said printed color components are additively combined in accordance with respective total plus and minus relative contributions of all said printed color components to respective ones of said electronically produced primary color components; and signal subtracting means further comprised in said second matrix circuit for algebraically combining the signals representing said respective total plus and minus contributions to each of said electronically produced primary color components; whereby the combined signals so obtained are adapted to respectively control said electronically produced primary color components so that said image-reproducing means displays said preview electronic color image.

11. An electronic previewer for displaying an electronic preview color image of the printed color reproduction which will be obtained from an original color picture by printing photo-engraved half-tone color-separation images thereof in pigments of the corresponding colors, said previewer comprising: electronic color-image-reproducing means for producing respectively controlled primary color components of light which form said displayed electronic image; electro-optical input means for deriving from said original picture electrical signals representing the relative areas of the colored half-tone dots which will be printed in each incremental region of said color reproduction by respective ones of said color-separation images; first signal processing means including a first additive matrix circuit for combining the individual dot area-representative signals in accordance with the logarithms of the contributions of all dots to the logarithms of the individually evaluated proportions of the color components which will be printed thereby in each of said regions; exponential signal-translating means further included in said first signal-translating means for converting said logarithmically combined signals to signals in said individually evaluated proportions of said printed color components; and second signal processing means for combining the printed color component-representative signals to produce signals for respectively controlling the said primary color components of light produced by said electronic image-reproducing means, such signal combination being in accordance with the color matching relationships between said printed color components and said electronically produced primary color components; whereby the control signals so obtained are adapted to respectively control said electronically produced color components so that said image-reproducing means displays said preview electronic color image.

12. An electronic previewer for displaying an electronic preview color image of the printed color reproduction which will be obtained from an original color picture by printing photo-engraved half-tone color-separation images thereof in pigments of the corresponding colors, said previewer comprising: electronic color-image-reproducing means for producing respectively controlled primary color components of light which form said displayed electronic image; electro-optical input means for deriving from said original picture electrical signals representing the relative areas of the colored half-tone dots which will be printed in each incremental region of said color reproduction by respective ones of said color-separation images; first signal processing means including a first additive matrix circuit for combining the individual dot area-representative signals in accordance with the logarithms of the contributions of all dots to the logarithms of the individually evaluated proportions of the color components which will be printed thereby in each of said regions; exponential signal-translating means further included in said first signal-translating means for converting said logarithmically combined signals to signals in said individually evaluated proportions of said printed color components; second signal processing means including a first matrix circuit for combining the printed color component-representative signals in accordance with the relative contributions of the corresponding individually evaluated printed color component proportions to the resultant proportions thereof; and a second matrix circuit further included in said second signal processing means for combining the signals representing the resultant proportions of said printed color components in accordance with the total of the relative contributions of all those components to respective ones of said primary color components of light produced by said electronic image-reproducing means; whereby the combined signals so obtained are adapted to respectively control said electronically produced primary color components so that said image-reproducing means displays said preview electronic color image.

References Cited in the file of this patent

UNITED STATES PATENTS 2,863,938 Evans et al. ............. Dec. 9, 1958
2,993,087 Hell .................... July 18, 1961